United States Patent
Matsunaga et al.

(10) Patent No.: US 8,293,180 B2
(45) Date of Patent: Oct. 23, 2012

(54) APPARATUS FOR DISTINGUISHING LIQUID REDUCING AGENT AND EXHAUST EMISSION CONTROL APPARATUS OF ENGINE

(75) Inventors: Hideki Matsunaga, Ageo (JP); Yoshikuni Satou, Nagoya (JP); Takashi Yamamoto, Nagoya (JP); Takeo Sasanuma, Nagoya (JP)

(73) Assignees: Nissan Diesel Motor Co., Ltd., Ageo-shi (JP); NGK Spark Plug Co., Ltd., Nagoya-shi (JP)

( * ) Notice: Subject to any disclaimer, the term of this patent is extended or adjusted under 35 U.S.C. 154(b) by 215 days.

(21) Appl. No.: 12/560,030

(22) Filed: Sep. 15, 2009

(65) Prior Publication Data

US 2010/0003168 A1 Jan. 7, 2010

Related U.S. Application Data

(63) Continuation of application No. PCT/JP2008/051046, filed on Jan. 25, 2008.

(30) Foreign Application Priority Data

Mar. 29, 2007 (JP) ................................. 2007-087850

(51) Int. Cl.
| | |
|---|---|
| F02D 41/00 | (2006.01) |
| G01N 1/00 | (2006.01) |
| G01N 25/00 | (2006.01) |
| F01N 3/00 | (2006.01) |
| F01N 3/10 | (2006.01) |
| G01N 25/56 | (2006.01) |
| G01N 33/00 | (2006.01) |
| G01K 3/00 | (2006.01) |

(52) U.S. Cl. .............. 422/119; 60/276; 60/286; 60/295; 60/301; 60/303; 123/679; 374/45; 374/54; 374/112; 374/114; 73/61.41; 73/61.76

(58) Field of Classification Search ........................ None
See application file for complete search history.

(56) References Cited

U.S. PATENT DOCUMENTS 7,651,262 B2 * 1/2010 Nishina et al. .................. 374/45
(Continued)

FOREIGN PATENT DOCUMENTS

EP 1 322 921 A2 9/2001
(Continued)

OTHER PUBLICATIONS

International Preliminary Report on Patentability, PCT/JP2008/051046, Oct. 29, 2009, 7 pgs.

*Primary Examiner* — In Suk Bullock
*Assistant Examiner* — Jennifer Wecker
(74) *Attorney, Agent, or Firm* — Foley & Lardner LLP

(57) ABSTRACT

An apparatus for distinguishing a liquid reducing agent which judges empty with a higher precision than heretofore is provided. The apparatus for distinguishing a liquid reducing agent is provided with a concentration sensor and a liquid-level sensor in storage tank of liquid reducing agent, and is characterized in that empty is judged by utilizing the liquid-level based on the liquid-level sensor in addition to the concentration based on the concentration sensor (step 3 and step 5). Even if a bubble is adhering to the concentration sensor and an erroneous signal indicative of empty is output although the residual quantity of liquid reducing agent is sufficient, the liquid-level sensor does not output a signal indicative of empty. Consequently, erroneous judgment is prevented and accurate judgment can be made as compared to heretofore.

10 Claims, 4 Drawing Sheets

U.S. PATENT DOCUMENTS

| | | | |
|---|---|---|---|
| 7,658,093 B2 * | 2/2010 | Nishina et al. | 73/61.46 |
| 2002/0056273 A1 * | 5/2002 | Itoh et al. | 60/286 |
| 2005/0011183 A1 | 1/2005 | Ripper et al. | |
| 2005/0207936 A1 * | 9/2005 | Berryhill et al. | 422/63 |
| 2007/0054409 A1 | 3/2007 | Inoue et al. | |
| 2007/0079599 A1 * | 4/2007 | Osaku et al. | 60/283 |
| 2007/0113625 A1 * | 5/2007 | Sasanuma et al. | 73/61.46 |
| 2007/0163240 A1 | 7/2007 | Nishina et al. | |
| 2007/0199308 A1 | 8/2007 | Satou et al. | |
| 2007/0209428 A1 | 9/2007 | Nishina et al. | |
| 2008/0087009 A1 | 4/2008 | Nishina et al. | |
| 2008/0089384 A1 | 4/2008 | Nishina et al. | |
| 2008/0110158 A1 | 5/2008 | Esaka | |
| 2008/0247912 A1 * | 10/2008 | Izutani et al. | 422/82.12 |
| 2009/0090178 A1 | 4/2009 | Sasanuma et al. | |
| 2009/0107116 A1 * | 4/2009 | Barber et al. | 60/286 |
| 2009/0193793 A1 | 8/2009 | Matsunaga | |

FOREIGN PATENT DOCUMENTS

| | | |
|---|---|---|
| EP | 1 356 194 B1 | 8/2004 |
| JP | 2000-027627 A | 1/2000 |
| JP | 2005-127262 A | 5/2005 |
| JP | 2005-133541 A | 5/2005 |
| JP | 2006-342782 A | 12/2006 |
| JP | 2007-55353 A | 3/2007 |
| JP | 2007-56741 A | 3/2007 |
| JP | 2007055353 A * | 3/2007 |
| WO | WO 02-27280 A2 | 4/2002 |
| WO | WO 02/057603 A1 | 7/2002 |
| WO | WO 2005-040567 A1 | 5/2005 |
| WO | WO 2005-040570 A1 | 5/2005 |
| WO | WO 2007/004583 A1 | 1/2007 |

* cited by examiner

US 8,293,180 B2

APPARATUS FOR DISTINGUISHING LIQUID REDUCING AGENT AND EXHAUST EMISSION CONTROL APPARATUS OF ENGINE

This application is a continuation of PCT/JP2008/051046, filed on Jan. 25, 2008, which is based upon and claims the benefit of priority from prior Japanese Patent Application No. 2007-087850, filed Mar. 29, 2007, the entire contents of all of which are incorporated herein by reference in their entirety.

FIELD

The present invention relates to a technique for distinguishing whether a liquid reducing agent or a precursor thereof in a reducing agent tank is empty, and specifically relates to an empty judgment technique of the reducing agent tank in an engine exhaust emission control apparatus (hereinafter, referred to as an "exhaust emission control apparatus"), which reduces and purifies nitrogen oxide ($NO_X$) in an exhaust.

BACKGROUND

An exhaust emission control apparatus that purifies and processes $NO_X$ to harmless components by injecting and supplying a liquid reducing agent or a precursor thereof to an exhaust upstream side of a $NO_X$-reduction catalyst arranged in an engine exhaust system to cause a catalytic reduction reaction between the $NO_X$ in the exhaust and the reducing agent has been proposed. In such an exhaust emission control apparatus, a technique for judging that a storage tank for storing the liquid reducing agent or the precursor thereof is empty, is described in Japanese Laid-open (Kokai) Patent Application Publication No. 2006-342782 (Patent Literature 1). In this technique, a concentration sensor that measures concentration of the liquid reducing agent or the precursor thereof based on a temperature rise characteristic of a heating element is used.

[Patent Literature 1] Japanese Laid-open (Kokai) Patent Application Publication No. 2006-342782

SUMMARY

Technical Problem

In the technique of empty judgment using the concentration sensor disclosed in Patent Literature 1, even if a liquid reducing agent or a precursor thereof is in a reducing agent tank in a sufficient amount, if a bubble adheres to the concentration sensor, it is difficult to perform an accurate concentration measurement. Accordingly, erroneous empty judgments are currently dealt with by variously devising measurement setting conditions of the concentration sensor.

In view of the above situation, it is an object of the present invention to provide an apparatus for distinguishing a liquid reducing agent or an exhaust emission control apparatus, which judges an empty state with higher precision.

Solution to Problem

The apparatus for distinguishing a liquid reducing agent proposed by the present invention to achieve the object includes: a heating element arranged in a reducing agent tank for storing a liquid reducing agent or a precursor thereof; a concentration measuring device that operates the heating element for a predetermined time and measures a concentration of the liquid reducing agent or the precursor thereof based on a temperature rise characteristic of the operated heating element; a liquid-level measuring device that measures a liquid-level of the liquid reducing agent or the precursor thereof in the reducing agent tank; and a reducing agent empty judging device that judges that the liquid reducing agent or the precursor thereof is empty when a comparison result obtained by comparing the concentration measured by the concentration measuring device with a first threshold and a comparison result obtained by comparing the liquid-level measured by the liquid-level measuring device with a second threshold satisfy a predetermined condition.

In the apparatus for distinguishing a liquid reducing agent, the predetermined condition for the empty judgment by the reducing agent empty judging device may be such that the concentration exceeds the first threshold and the liquid-level becomes equal to or lower than the second threshold.

The apparatus for distinguishing a liquid reducing agent may further include: a counting device that counts a frequency of empty judgment when the reducing agent empty judging device judges that the reducing agent tank is empty; and an empty judgment finalizing device that finalizes the empty judgment when the frequency of empty judgment counted by the counting device becomes equal to or more than a predetermined number. The apparatus for distinguishing a liquid reducing agent having such a configuration may further include an informing device that informs that the reducing agent tank is empty when the empty judgment finalizing device finalizes the empty judgment. Moreover the apparatus for distinguishing a liquid reducing agent may further include a reset device that resets the frequency of empty judgment and finalization of empty judgment when the reducing agent empty judging device judges that the reducing agent tank is not empty.

An exhaust emission control apparatus proposed by the present invention to achieve the object includes: a reducing agent tank for storing a liquid reducing agent or a precursor thereof; a reduction catalyst for reducing and purifying nitrogen oxide in an exhaust by using the liquid reducing agent or the precursor thereof in the reducing agent tank; a concentration measuring device that operates a heating element arranged in the reducing agent tank for a predetermined time and measures a concentration of the liquid reducing agent or the precursor thereof based on a temperature rise characteristic of the operated heating element; a liquid-level measuring device that measures a liquid-level of the liquid reducing agent or the precursor thereof in the reducing agent tank; and a reducing agent empty judging device that judges that the liquid reducing agent or the precursor thereof is empty, when a comparison result obtained by comparing the concentration measured by the concentration measuring device with a first threshold and a comparison result obtained by comparing the liquid-level measured by the liquid-level measuring device with a second threshold satisfy a predetermined condition.

In the exhaust emission control apparatus, the predetermined condition for the empty judgment by the reducing agent empty judging device may be such that the concentration exceeds the first threshold and the liquid-level becomes equal to or lower than the second threshold.

Moreover, the exhaust emission control apparatus may further include: a counting device that counts a frequency of empty judgment when the reducing agent empty judging device judges that the reducing agent tank is empty; and an empty judgment finalizing device that finalizes the empty judgment when the frequency of empty judgment counted by the counting device becomes equal to or more than a predetermined number. The exhaust emission control apparatus having such a configuration may further include an informing device that informs that the reducing agent tank is empty when the empty judgment finalizing device finalizes the empty judgment. Furthermore, the exhaust emission control apparatus may further include a reset device that resets the frequency of empty judgment and finalization of empty judgment when the reducing agent empty judging device judges that the reducing agent tank is not empty.

Advantageous Effects of Invention

According to the apparatus for distinguishing a liquid reducing agent or the exhaust emission control apparatus according to the proposal of the present invention, accurate judgment can be made as compared to the heretofore, by performing the empty judgment by using a liquid-level based on the liquid-level measuring device in addition to the concentration based on the concentration measuring device. That is, even if a bubble is adhering to or present around the heating element and an erroneous signal indicative of empty is output from the concentration measuring device although the residual quantity of the liquid reducing agent or the precursor thereof is sufficient, the liquid-level measuring device does not output a signal indicative of empty. Consequently, erroneous judgment is prevented.

In this apparatus, when a condition for the empty judgment is such that the concentration exceeds the first threshold and the liquid-level is equal to or lower than the second threshold, an upper limit value of the concentration, which is not measured generally if a normal liquid reducing agent or a precursor thereof is present, can be set as the first threshold, and a lower limit value of liquid-level for indicating the lowest level of liquid-level, which is divided into a plurality of stages and displayed, can be set as the second threshold. Consequently, more accurate empty judgment can be executed.

In the above-described apparatus, if a counting device and an empty judgment finalizing device are provided so that the empty judgment is finalized when the frequency of empty judgment is counted for a predetermined number of times, reliability of measurement can be further increased. Furthermore if an informing device that informs finalization of the empty judgment is provided, a user can be urged to replenish the liquid reducing agent or the precursor thereof. Moreover, if a reset device is provided so that when it is judged that the reducing agent tank is not empty, the frequency of empty judgment and finalization of empty judgment are reset to restart counting from the beginning, generation of an erroneous finalization can be reduced as low as possible.

BRIEF DESCRIPTION OF DRAWINGS

FIGS. 2A and 2B illustrate a sensor that measures concentration and liquid-level of a urea aqueous solution, wherein FIG. 2A is an explanatory diagram of a structure thereof and FIG. 2B is an explanatory diagram of a principle of concentration measurement;

DESCRIPTION OF EMBODIMENTS

Hereunder is a description of a preferred embodiment, with reference to accompanying drawings.

Figure 1:
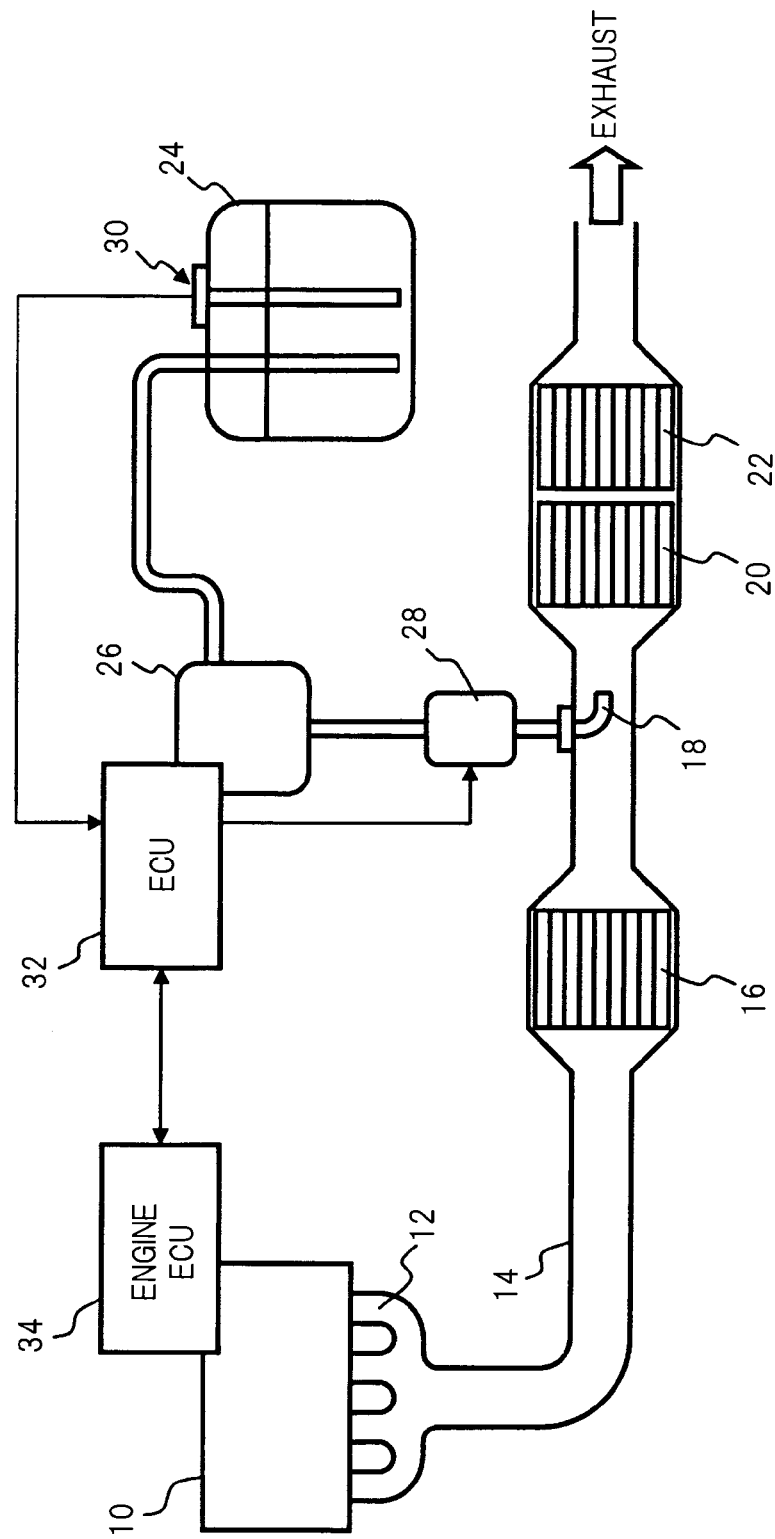
FIG. 1 is an overall configuration diagram illustrating one example of an exhaust emission control apparatus provided with an apparatus for distinguishing a liquid reducing agent according to the present invention.

FIG. 1 illustrates an overall configuration of an exhaust emission control apparatus that uses a urea aqueous solution as a precursor of a liquid reducing agent to reduce and purify $NO_X$ in an engine exhaust.

In an exhaust pipe 14 connected to an exhaust manifold 12 of an engine 10, there is respectively arranged along an exhaust flow direction; a nitrogen oxidation catalyst 16 which oxidizes nitrogen monoxide (NO) to nitrogen dioxide ($NO_2$), an injection nozzle 18 which injects and supplies the urea aqueous solution, a $NO_X$ reduction catalyst 20 which reduces and purifies $NO_X$ by using ammonia obtained by hydrolysis of the urea aqueous solution, and an ammonia oxidation catalyst 22 which oxidizes ammonia that has passed through the $NO_X$ reduction catalyst 20. On the other hand, the urea aqueous solution stored in a reducing agent tank 24 is supplied to the injection nozzle 18 via a pump module 26 which sucks and pumps the urea aqueous solution, and an additional module 28 which controls an injection flow rate thereof.

In the embodiment, urea aqueous solution is used, however, an ammonia solution or the like can be used according to the specification of the $NO_X$ reduction catalyst 20.

In the exhaust emission control apparatus, the urea aqueous solution injected and supplied from the injection nozzle 18 is hydrolyzed by using the exhaust and water vapor in the exhaust, and is converted into ammonia. It is a well-known fact that the converted ammonia reacts with the $NO_X$ in the exhaust in the $NO_X$ reduction catalyst 20, and is converted into water ($H_2O$) and nitrogen ($N_2$). Upon this reaction, the NO is oxidized to $NO_2$ by the nitrogen oxidation catalyst 16 in order to improve the $NO_X$ purification efficiency in the $NO_X$ reduction catalyst 20, and the ratio of NO to $NO_2$ in the exhaust is improved to a ratio suitable for the reduction reaction. On the other hand, the ammonia that has passed through the $NO_X$ reduction catalyst 20 is oxidized by the ammonia oxidation catalyst 22 arranged on the downstream side of the exhaust. Therefore, the discharge of ammonia directly into the air is prevented.

Figure 2A:
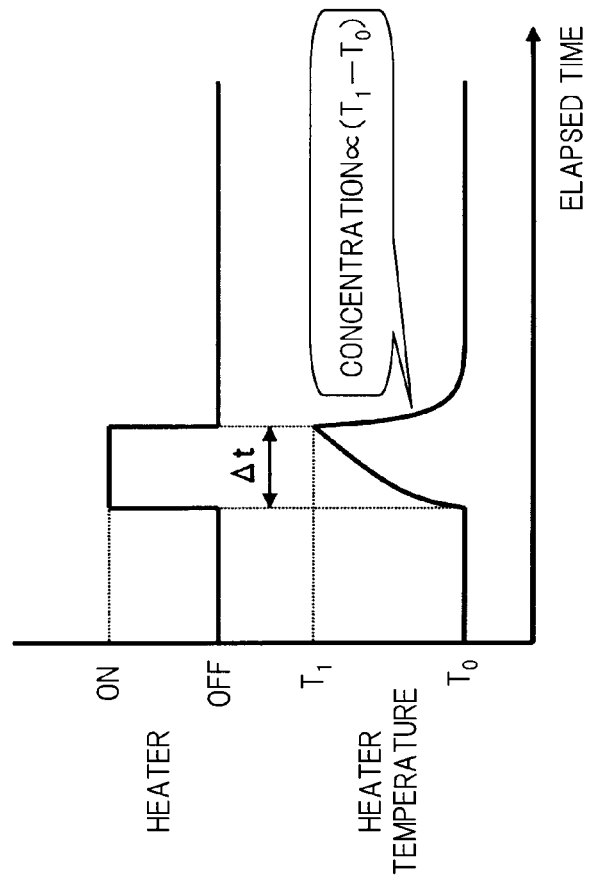

A sensor 30 that functions as a concentration measuring device for measuring the concentration of the urea aqueous solution (urea concentration) and functions as a liquid-level measuring device for measuring a liquid-level (liquid surface level) of the urea aqueous solution, is fitted to the reducing agent tank 24. In the sensor 30, as indicated in FIG. 2A, a base 30A having a built-in circuit board is fixed to a top wall of the reducing agent tank 24, and a support 30B is suspended from the base 30A toward the bottom of the reducing agent tank 24. Moreover a ceramics heater 30C (heating element) is fixed to the end (free end) of the support 30B.

Figure 2B:
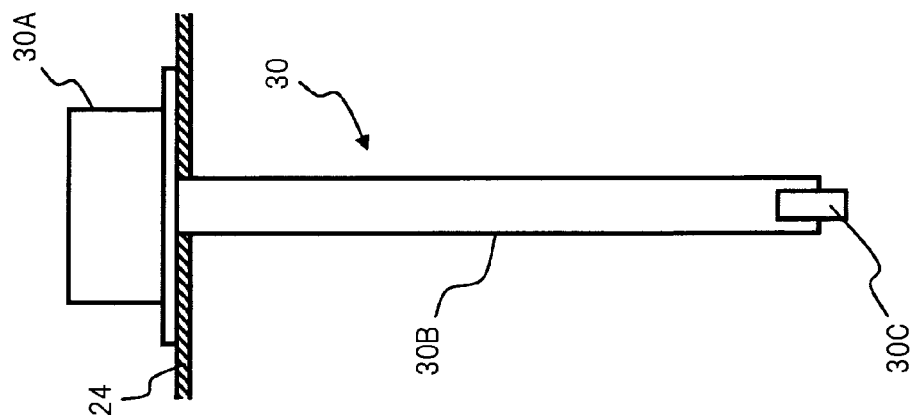

As indicated in FIG. 2B, the sensor 30 is a concentration sensor that indirectly measures the concentration based on a temperature rise characteristic ($T_1-T_0$) at the time of operating the ceramics heater 30C for a predetermined time $\Delta t$, that is, a heat release characteristic where the urea aqueous solution is a heat transfer medium. Furthermore in the embodiment, the support 30B of the sensor 30 has a configuration where an inner electrode and an outer electrode having a circular shape in cross-section are arranged concentrically, and an insulating film is applied to an outer circumference of the inner electrode, and also functions as a liquid-level sensor which indirectly measures the liquid-level based on a capacitance between the electrodes.

The configuration of the sensor 30 in the embodiment where; the concentration sensor for measuring the urea concentration based on the temperature rise characteristic of the ceramics heater 30C, and the liquid-level sensor for measuring the liquid-level based on the capacitance between the inner electrode and the outer electrode, are integrally formed, is known by the pamphlet of International Patent Publication No. WO2007/004583, and hence detailed description thereof is omitted.

As the concentration sensor, besides the above concentration sensor, one having a configuration where two temperature sensors are respectively arranged at two positions adjacent to each other, and a heater is provided for one temperature sensor, can be used. Moreover, the liquid-level sensor can be formed separately from the concentration sensor, or can have a mechanism for measuring the liquid-level based on a float floating on a liquid surface.

Figure 3:
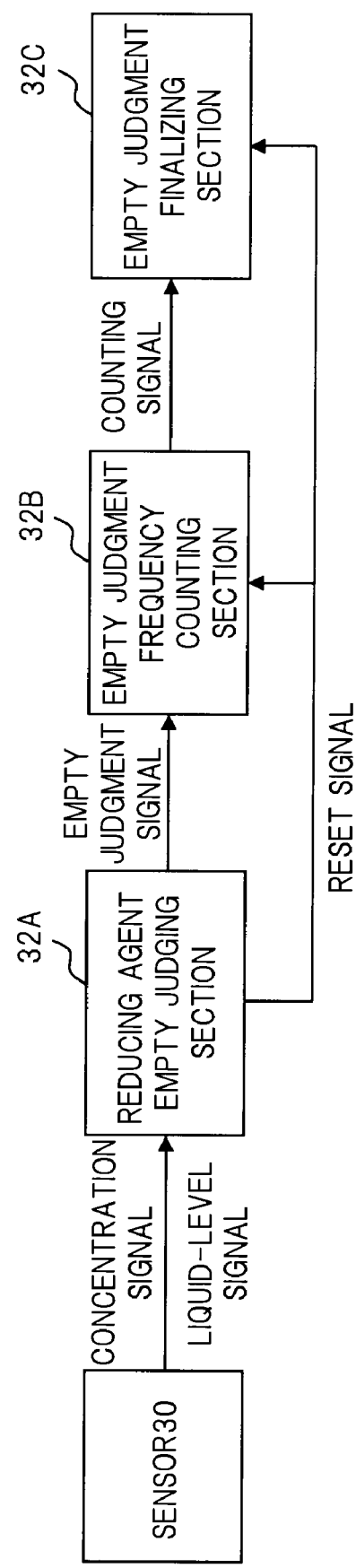
FIG. 3 is a block diagram of various functions for performing empty judgment.

An output signal of the sensor 30, specifically, a concentration signal and a liquid-level signal, are input to a control unit 32 having a computer built therein. An ignition switch signal or the like is input to the control unit 32 from an engine control unit 34 that performs various controls of the engine 10, via a controller area network (CAN) or the like. In the control unit 32, a control program stored in a read only memory (ROM) or the like is executed, to thereby realize, as indicated in FIG. 3, a reducing agent empty judging section 32A, an empty judgment frequency counting section 32B, and an empty judgment finalizing section 32C. That is, in the embodiment, the apparatus for distinguishing a liquid reducing agent is constituted by the sensor 30 and the control unit 32. The control program can be executed not only by the control unit 32 but also by an existing control unit such as the engine control unit 34.

The reducing agent empty judging section 32A functions as a reducing agent empty judging device and a reset device, and judges whether the urea aqueous solution is empty based on the concentration signal and the liquid-level signal from the sensor 30, for each predetermined time after starting the engine (for example, for the time or longer obtained by adding the time until the heater temperature returns to $T_0$ to the time $\Delta t$ indicated in FIG. 2B), and outputs an empty judgment signal or a reset signal corresponding to the judgment result. The empty judgment frequency counting section 32B functions as a counting device, and counts the frequency of empty judgment when the empty judgment signal is output. On the other hand, when the reset signal is output, the empty judgment frequency counting section 32B resets (clears) the counting up to that time. The empty judgment finalizing section 32C functions as an empty judgment finalizing device, and finalizes the empty judgment when the frequency of empty judgment is equal to or more than a predetermined number of times, based on the counting signal output from the empty judgment frequency counting section 32B, and outputs an empty judgment finalizing signal. Moreover if the empty judgment finalizing signal is output at the time of outputting the reset signal, the empty judgment finalizing section 32C resets the empty judgment finalizing signal.

Figure 4:
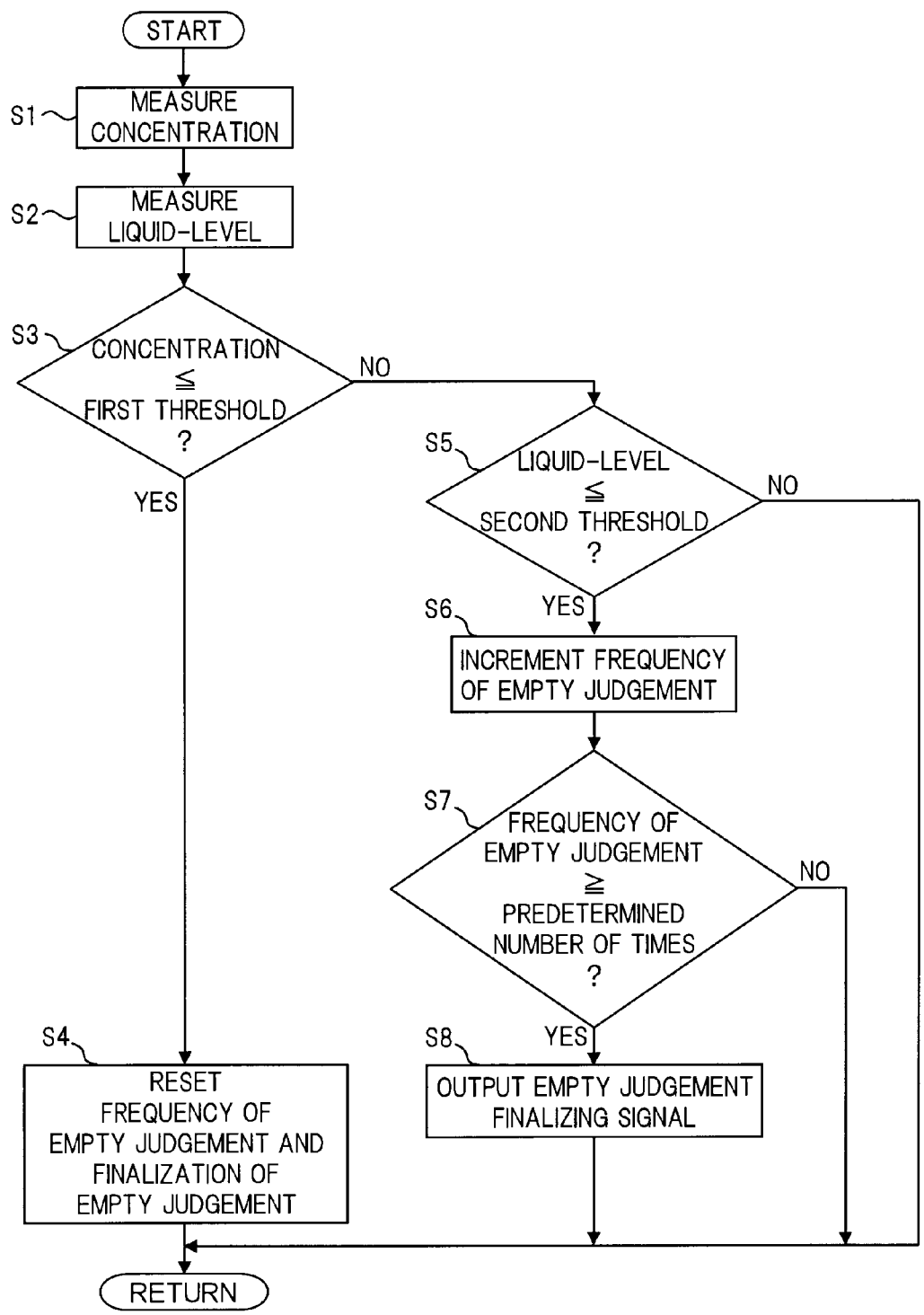
FIG. 4 is a flowchart illustrating empty judgment.

Next is a description of the various functions according to the empty judgment, with reference to the flowchart of FIG. 4.

The reducing agent empty judging section 32A reads the concentration signal from the sensor 30 in step 1 (written as "S1" in the figure, and denoted similarly hereunder), and also reads the liquid-level signal from sensor 30 in step 2.

In the next step 3, the reducing agent empty judging section 32A compares the measured concentration with the first threshold, and judges whether the concentration satisfies a condition where it is higher than the first threshold. The first threshold with respect to the concentration is for judging whether the urea aqueous solution is empty, and is set to an upper limit value of the concentration, which is not measured generally if the normal urea aqueous solution is present. As a result of the comparison with the first threshold, when the concentration is equal to or lower than the first threshold so that the condition is not satisfied, the reducing agent empty judging section 32A proceed to step 4 and outputs the reset signal, and resets counting by the empty judgment frequency counting section 32B and the empty judgment finalization by the empty judgment finalizing section 32C, and then restarts step 1 after waiting for a predetermined time. That is, when the measured concentration is equal to or lower than the first threshold, the reducing agent empty judging section 32A can judge that the urea aqueous solution is not empty without judgment of the liquid-level, and hence the processing for judging the liquid-level can be omitted.

On the other hand, when the condition that the concentration is higher than the first threshold is satisfied, the reducing agent empty judging section 32A proceeds to step 5, and compares the measured liquid-level with a second threshold, and judges whether a condition that the liquid-level is equal to or lower than the second threshold is satisfied. The second threshold with respect to the liquid-level is for judging that the urea aqueous solution is empty, and is set to the lower limit value of the liquid-level for indicating the lowest level 0 of liquid-level, which is divided into five stages and displayed by using, for example, a plurality of LEDs. As a comparison result with the second threshold, when the liquid-level is higher than the second threshold and does not satisfy the condition, the reducing agent empty judging section 32A restarts step 1 after waiting for a predetermined time.

On the other hand, when the condition that the liquid-level is equal to or lower than the second threshold is satisfied, the reducing agent empty judging section 32A performs the empty judgment that the urea aqueous solution is empty, and outputs the empty judgment signal, and proceeds to step 6. In step 6, the frequency of empty judgment is incremented by one in the empty judgment frequency counting section 32B. Then the counting signal indicating the counting result of the frequency of empty judgment is output from the empty judgment frequency counting section 32B to the empty judgment finalizing section 32C, and in step 7, the empty judgment finalizing section 32C judges whether the frequency of empty judgment after counting is equal to or more than the predetermined number of times. The predetermined number of times is a value set in order to further increase the accuracy of the empty judgment by avoiding as much as possible, erroneous judgment due to fluctuations in the liquid surface, and a natural number equal to or higher than 2 is set. As a result of judgment, when the frequency of empty judgment is lower than the predetermined number of times, step 1 is restarted after waiting for a predetermined time.

At this time, that is, after step 1 is restarted while the frequency of empty judgment does not reach the predetermined number of times, when in step 3 it is judged that the concentration is equal to or lower than the first threshold (that is, the condition is not satisfied), control proceeds to step 4 and the reset signal is output, and the counting by the empty judgment frequency counting section 32B is reset. When at this timing, it is judged that the urea aqueous solution is not empty, the counting of the frequency of empty judgment is reset to restart the counting from the beginning, so that generation of an erroneous finalization can be reduced as low as possible.

In step 7, when the frequency of empty judgment is equal to or more than the predetermined time of times, control proceeds to step 8 where the empty judgment finalizing section 32C finalizes the empty judgment, and outputs an empty judgment finalizing signal. When the empty judgment finalizing signal is output, an informing device such as a buzzer or an LED operates, and it is informed to a user that the urea aqueous solution in the reducing agent tank 24 is empty.

Accordingly, the user is urged to replenish the urea aqueous solution, and the function of the exhaust emission control apparatus can be maintained.

After the empty judgment finalizing signal is output, step 1 is restarted after waiting for a predetermined time. However, after the empty judgment finalizing signal has been output once, reset of the empty judgment finalizing signal is not performed until it is judged in step 3 that the concentration is equal to or lower than the first threshold, that is, until the urea aqueous solution is replenished.

As described above, since the empty judgment is performed by using both the concentration and the liquid-level, even if a bubble is adhering to or present around the ceramics heater 30C (in other words, the concentration sensor) and a concentration signal indicative of empty is output although the residual quantity of the urea aqueous solution is sufficient, a liquid-level signal indicative of empty is not shown. Consequently, erroneous judgment is prevented and more accurate judgment can be made as compared to heretofore.

It should also be understood that many modifications and variations of the described embodiments of the invention will occur to a person having an ordinary skill in the art without departing from the spirit and scope of the present invention as claimed in the appended claims.

Reference Signs List
10 Engine
20 $NO_X$ reduction catalyst
24 Reducing agent tank
30 Sensor
30C Ceramics heater
32 Control unit
32A Reducing agent empty judging section
32B Empty judgment frequency counting section
32C Empty judgment finalizing section

What is claimed is:

1. An apparatus for distinguishing a liquid reducing agent, comprising:
   a heating element arranged in a reducing agent tank for storing a liquid reducing agent or a precursor thereof;
   a concentration measuring device that operates the heating element for a predetermined time and measures a concentration of the liquid reducing agent or the precursor thereof based on a temperature rise characteristic of the operated heating element;
   a liquid-level measuring device that measures a liquid-level of the liquid reducing agent or the precursor thereof in the reducing agent tank; and
   a reducing agent empty judging device that judges whether or not the liquid reducing agent or the precursor thereof is absent, based on the concentration measured by the concentration measuring device and the liquid-level measured by the liquid-level measuring device,
   wherein the reducing agent empty judging device judges that the liquid reducing agent or the precursor thereof is absent, when both of the concentration measured by the concentration measuring device and the liquid-level measured by the liquid-level measured device indicate that the reducing agent tank is empty, and
   wherein the reducing agent empty judging device disregards an error signal due to a bubble adhesion to the heating element and does not judge that the liquid reducing agent or the precursor thereof is absent, when the concentration measured by the concentration measuring device indicates that the reducing agent tank is empty and the liquid-level measured by the liquid-level measuring device indicates that the reducing agent tank is not empty.

2. An apparatus for distinguishing a liquid reducing agent according to claim 1, further comprising:
   a counting device that counts a frequency of empty judgment when the reducing agent empty judging device judges that the reducing agent tank is empty; and
   an empty judgment finalizing device that finalizes the empty judgment when the frequency of empty judgment counted by the counting device becomes equal to or more than a predetermined number.

3. An apparatus for distinguishing a liquid reducing agent according to claim 2, further comprising an informing device that informs that the reducing agent tank is empty when the empty judgment finalizing device finalizes the empty judgment.

4. An apparatus for distinguishing a liquid reducing agent according to claim 2, further comprising a reset device that resets the frequency of empty judgment and finalization of empty judgment when the reducing agent empty judging device judges that the reducing agent tank is not empty.

5. An exhaust emission control apparatus, comprising:
   a reducing agent tank for storing a liquid reducing agent or a precursor thereof;
   a reduction catalyst for reducing and purifying nitrogen oxide in an exhaust by using the liquid reducing agent or the precursor thereof in the reducing agent tank;
   a concentration measuring device that operates a heating element arranged in the reducing agent tank for a predetermined time and measures a concentration of the liquid reducing agent or the precursor thereof based on a temperature rise characteristic of the operated heating element;
   a liquid-level measuring device that measures a liquid-level of the liquid reducing agent or the precursor thereof in the reducing agent tank; and
   a reducing agent empty judging device that judges whether or not the liquid reducing agent or the precursor thereof is absent, based on the concentration measured by the concentration measuring device and the liquid-level measured by the liquid-level measuring device,
   wherein the reducing agent empty judging device judges that the liquid reducing agent or the precursor thereof is absent, when both of the concentration measured by the concentration measuring device and the liquid-level measured by the liquid-level measured device indicate that the reducing agent tank is empty, and
   wherein the reducing agent empty judging device disregards an error signal due to a bubble adhesion to the heating element and does not judge that the liquid reducing agent or the precursor thereof is absent, when the concentration measured by the concentration measuring device indicates that the reducing agent tank is empty and the liquid-level measured by the liquid-level measuring device indicates that the reducing agent tank is not empty.

6. An exhaust emission control apparatus according to claim 5, further comprising:
   a counting device that counts a frequency of empty judgment when the reducing agent empty judging device judges that the reducing agent tank is empty; and
   an empty judgment finalizing device that finalizes the empty judgment when the frequency of empty judgment counted by the counting device becomes equal to or more than a predetermined number.

7. An exhaust emission control apparatus according to claim 6, further comprising an informing device that informs that the reducing agent tank is empty when the empty judgment finalizing device finalizes the empty judgment.

8. An exhaust emission control apparatus according to claim 6, further comprising a reset device that resets the frequency of empty judgment and finalization of empty judgment when the reducing agent empty judging device judges that the reducing agent tank is not empty.

9. An apparatus for distinguishing a liquid reducing agent according to claim 1, further comprising an inner electrode and an outer electrode suspended in the reducing agent tank,
   wherein the liquid-level measuring device measures the liquid-level of the liquid reducing agent or the precursor thereof based on a capacitance between the electrodes.

10. An exhaust emission control apparatus according to claim 5, wherein the liquid-level measuring device measures the liquid-level of the liquid reducing agent or the precursor thereof based on a capacitance between an inner electrode and an outer electrode suspended in the reducing agent tank.

* * * * *